(12) United States Patent
Hwang et al.

(10) Patent No.: US 10,714,975 B2
(45) Date of Patent: Jul. 14, 2020

(54) DUAL BAND WIRELESS POWER RECEPTION UNIT

(71) Applicant: MAPS, INC., Yongin-si, Gyeonggi-do (KR)

(72) Inventors: Jong-Tae Hwang, Seoul (KR); Sung-Min Park, Seoul (KR); Ki-Woong Jin, Anyang-si (KR); Sang-O Jeon, Suwon-si (KR); Ik-Gyoo Song, Incheon (KR); Hyun-Ick Shin, Seoul (KR); Joon Rhee, Seoul (KR)

(73) Assignee: MAPS, INC., Yongin-si (KR)

( * ) Notice: Subject to any disclaimer, the term of this patent is extended or adjusted under 35 U.S.C. 154(b) by 514 days.

(21) Appl. No.: 15/554,845

(22) PCT Filed: Feb. 29, 2016

(86) PCT No.: PCT/KR2016/002001
§ 371 (c)(1),
(2) Date: Aug. 31, 2017

(87) PCT Pub. No.: WO2016/140482
PCT Pub. Date: Sep. 9, 2016

(65) Prior Publication Data
US 2018/0048185 A1 Feb. 15, 2018

(30) Foreign Application Priority Data

Mar. 5, 2015 (KR) .................. 10-2015-0031104
Feb. 25, 2016 (KR) .................. 10-2016-0022705

(51) Int. Cl.
*H02J 50/15* (2016.01)
*H02J 7/02* (2016.01)
(Continued)

(52) U.S. Cl.
CPC .............. *H02J 50/12* (2016.02); *H02J 7/025* (2013.01); *H02J 50/20* (2016.02)

(58) Field of Classification Search
CPC ............. H02J 50/12; H02J 50/20; H02J 7/025
(Continued)

(56) References Cited

U.S. PATENT DOCUMENTS 9,397,505 B2 7/2016 Lee et al.
9,413,175 B2 8/2016 Park et al.
(Continued)

FOREIGN PATENT DOCUMENTS

KR  10-2009-0011509 A   2/2009
KR     10-1036133 B1    5/2011
(Continued)

OTHER PUBLICATIONS

International Search Report dated May 23, 2016 in corresponding International Application No. PCT/KR2016/002001 (2 pages in English, 3 pages in Korean).

*Primary Examiner* — Rexford N Barnie
*Assistant Examiner* — Toan T Vu
(74) *Attorney, Agent, or Firm* — NSIP Law

(57) ABSTRACT

A dual band wireless power reception unit is disclosed. The wireless power reception unit according to one embodiment comprises: a first resonator; a second resonator connected to the first resonator in parallel; a single rectifier having, as an input, a node in which outputs of the first resonator and the second resonator are connected to each other in parallel; at least one switch having a first output, a second output, and an input, wherein the second output is connected to the ground; at least one capacitor connected to the second resonator in parallel, and of which one terminal is connected to the first output of the switch and the other terminal is connected to the rectifier input; and a frequency sensor (Continued)

sensing an input frequency from the rectifier input, and of which an output is connected to the input of the switch.

5 Claims, 15 Drawing Sheets

(51) Int. Cl.
*H02J 50/12* (2016.01)
*H02J 50/20* (2016.01)

(58) Field of Classification Search
USPC ........................ 307/82, 84, 104; 320/107–109
See application file for complete search history.

(56) References Cited

U.S. PATENT DOCUMENTS

| | | |
|---|---|---|
| 9,590,446 B2 | 3/2017 | Park et al. |
| 2012/0086281 A1* | 4/2012 | Kanno ..................... H01Q 3/26 307/82 |
| 2012/0306282 A1 | 12/2012 | Tan et al. |
| 2013/0077360 A1 | 3/2013 | Low et al. |
| 2014/0368052 A1 | 12/2014 | Norconk et al. |

FOREIGN PATENT DOCUMENTS

| | | |
|---|---|---|
| KR | 10-2014-0131428 A | 11/2014 |
| KR | 10-2014-0142163 A | 12/2014 |

* cited by examiner

DUAL BAND WIRELESS POWER RECEPTION UNIT

CROSS REFERENCE TO RELATED APPLICATION(S)

This application is a National Phase entry of PCT Application No. PCT/KR2016/002001, filed on Feb. 29, 2016, which claims priority under 35 U. S. C. § 119(e), 120 and 365(c) to Korean Patent Application No. 10-2015-0031104, filed on Mar. 5, 2015, and Korean Patent Application No. 10-2016-0022705, filed on Feb. 25, 2016.

TECHNICAL FIELD

The present invention relates to a wireless power receiving unit (PRU).

BACKGROUND ART

Recently, wireless charging systems have been largely implemented in two methods. One method is a tightly coupled method in which an antenna of a power transmitting unit (PTU) and an antenna of a power receiving unit (PRU) should be positionally matched and close to each other. This method has good efficiency because an operating frequency is low and the antenna of the PTU and the antenna of the PRU are positioned within a short distance of each other and are comparatively accurately matched to each other, and also has an established control method because a control method thereof is similar to a conventional resonant inverter method. As a standard adopted by such a technology, the Power Matters Alliance (PMA) method and the Qi method of the Wireless Power Consortium (WPC) exist.

The Qi method and the PMA method have good efficiency and comparatively low production costs. However, it is difficult for a single PTU to simultaneously supply energy to two or more PRUs, and also charging efficiency is rapidly reduced when an antenna of a PTU and an antenna of a PRU are not positionally matched. Also, even when a distance between the PTU and the PRU increases slightly, charging efficiency decreases, and thus the above-described methods are inconvenient for general users to use.

In order to solve these problems, unlike the above-described standard, a standard capable of performing a charging action regardless of distance and position by increasing an energy transmission frequency by using magnetic resonance technology has been proposed. The Alliance for Wireless Power (A4WP) is a representative standard thereof. While the Qi and PMA methods transmit energy at a frequency ranging from about 80 kHz to about 200 kHz, the A4WP may have a small antenna at a high frequency of 6.78 MHz and may be capable of wireless charging even when antennas are separated from each other by matching resonant frequencies of resonators of a PRU and a PTU. By using the A4WP method, it is not difficult to supply several Watts of power in an area of several $cm^2$, and it is also possible to simultaneously transmit energy to several PRUs. This method is called a loosely coupled method. However, this method has a high operating frequency so that implementation is difficult and also has lower efficiency than a tightly coupled method because active elements are driven at a high frequency.

The Qi, PMA, and A4WP methods each have advantages and disadvantages, and thus the three methods are mixed and used. However, the standards have different frequencies, and thus wireless charging standards thereof are not compatible with each other. Accordingly, there is a need for a PRU capable of receiving wireless power from PTUs of any standard.

DETAILED DESCRIPTION OF THE INVENTION

Technical Problem

According to an embodiment, a dual-band wireless power receiving unit (PRU) capable of receiving energy from different resonators with a single rectifier is proposed.

Technical Solution

A wireless power receiving unit (PRU) according to an embodiment includes a first resonator; a second resonator connected in parallel to the first resonator; a single rectifier having, as an input, a node in which outputs of the first resonator and the second resonator are connected in parallel to each other; at least one switch having a first output, a second output connected to a ground, and an input; at least one capacitor connected in parallel to the second resonator and having one terminal connected to the first output of the switch and another terminal connected to the input of the rectifier; and a frequency detector configured to detect an input frequency from the input of the rectifier and having an output connected to the input of the switch.

The first resonator may be a high-frequency resonator, and the second resonator may be a low-frequency resonator. The first resonator may be a series resonator having at least one inductor and at least one capacitor connected in series. The second resonator may be a series resonator having at least one inductor and at least one capacitor connected in series.

The switch may be turned on when the frequency detected by the frequency detector is a low frequency and may be turned off to separate the capacitor from the input of the rectifier when the frequency detected by the frequency detector is a high frequency.

Advantageous Effects of the Invention

According to the present invention, a dual-band wireless power receiving unit (PRU) for receiving power in a wireless manner by two resonators having different resonant frequencies being connected using a single rectifier is proposed. When energy is intended to be transferred to a single resonator, the energy may be transferred to the other resonator, and thus may not be easily transferred to the rectifier. Accordingly, two rectifiers should be used in a conventional technique. However, according to the present invention, the problem is solved by using an additional switch, and thus it is possible to receive energy from different resonators by using a single rectifier.

It is also possible to produce a wireless PRU that supports both of a high-frequency charging method such as an Alliance for Wireless Power (A4WP) method and a low-frequency charging method such as a Qi method or a Power Matters Alliance (PMA) method.

MODE OF THE INVENTION

Hereinafter, embodiments of the present invention will be described in detail with reference to the accompanying drawings. In the following description, when a detailed description of a relevant known function or configuration is determined to unnecessarily obscure the gist of the present invention, the detailed description will be omitted. Also, terms used herein are defined in consideration of the functions of the present invention and may be changed depending on a user, the intent of an operator, or a custom. Accordingly, the terms must be defined on the basis of the following overall description of this specification.

Figure 1:
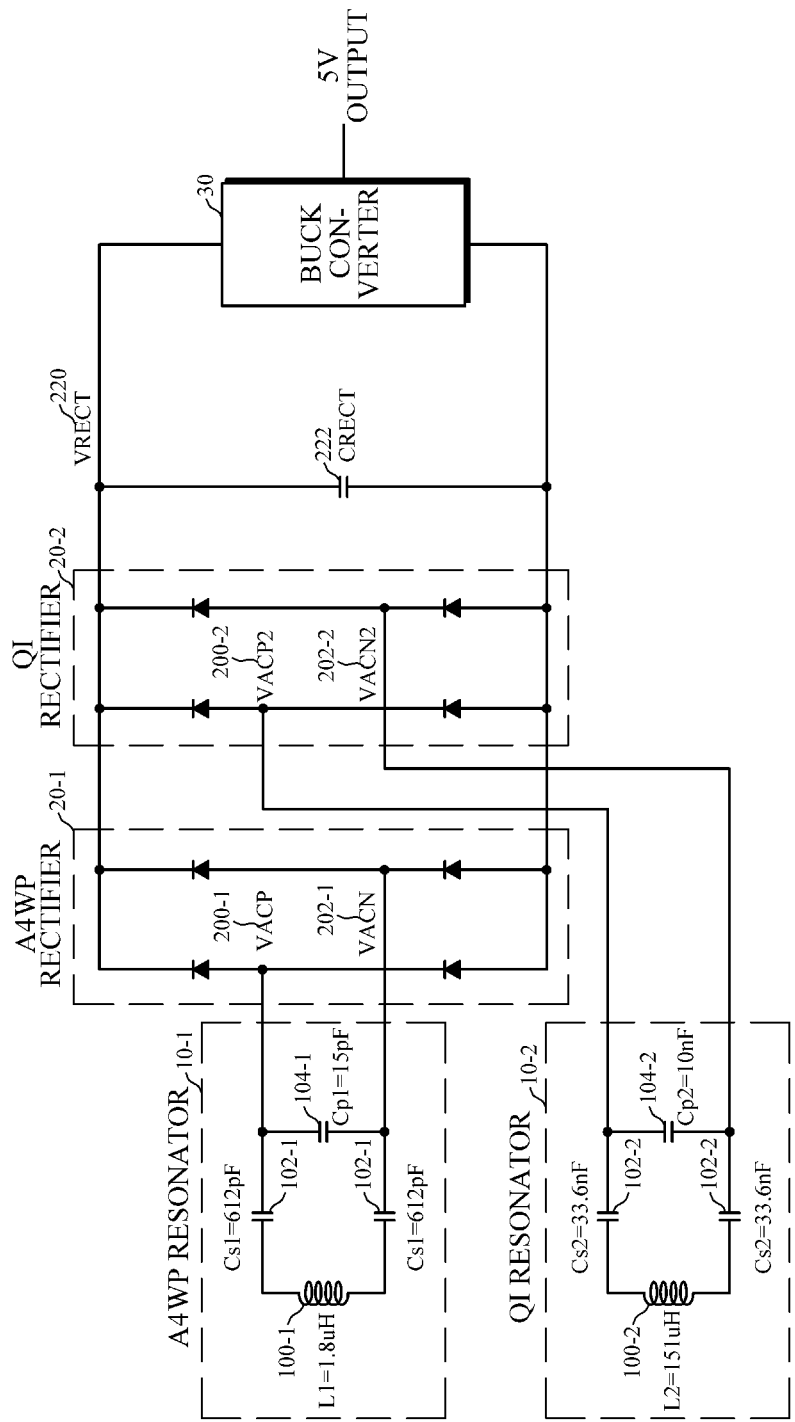
FIG. 1 is a circuit diagram showing a wireless power receiving unit (PRU) having two resonators and two rectifiers in order to accommodate both of a Qi method and an Alliance for Wireless Power (A4WP) method.

FIG. 1 is a circuit diagram showing a wireless power receiving unit (PRU) having two resonators and two rectifiers in order to accommodate both of a Qi method and an Alliance for Wireless Power (A4WP) method.

Referring to FIG. 1, a general dual-band wireless PRU includes a resonator and a rectifier that are appropriate for high frequencies and a resonator and a rectifier that are appropriate for low frequencies. For high frequencies, the A4WP method may be used. Hereinafter, the high-frequency resonator and the high-frequency rectifier will be described using an A4WP resonator 10-1 and an A4WP rectifier 20-1 as an example. For low frequencies, the Qi method or a Power Matters Alliance (PMA) method, which have similar frequency bands and operating methods, may be used. Hereinafter, the low-frequency resonator and the low-frequency rectifier will be described using a Qi resonator 10-2 and a Qi rectifier 20-2 as an example. However, this is for the purpose of a user's convenience, and thus when both the Qi method and the A4WP method can be used both the PMA method and the A4WP method can be used.

The A4WP resonator 10-1 includes an inductor L1 100-1 and capacitors Cs1 102-1 and Cp1 104-1. The Qi resonator 10-2 includes an inductor L2 100-2 and capacitors Cs2 102-2 and Cp2 104-2. In FIG. 1, L1 100-1, Cs1 102-1, Cp1 104-1, L2 100-2, Cs2 102-2, and Cp2 104-2 have values assumed to implement a stable circuit, but are not limited thereto.

The resonators 10-1 and 10-2 are connected to input voltages VACP 200-1 and VACN 202-1 of the A4WP rectifier 20-1 and input voltages VACP2 200-2 and VACN2 202-2 of the Qi rectifier 20-2, respectively. A capacitor CRECT 222 is connected to a rectifier output voltage VRECT 220 to convert received alternating current (AC) power into direct current (DC) power. A buck converter 30 converts the rectifier output voltage VRECT 220 into a precise voltage necessary for a load, and supplies a stable voltage to the load. In FIG. 1, the buck converter 30 is assumed to output 5V.

Figure 2:
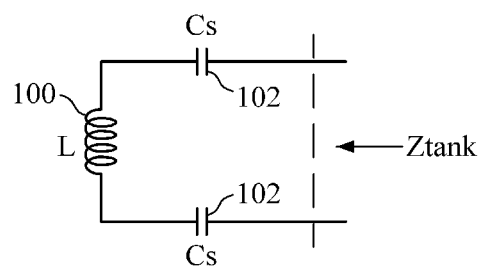
FIG. 2 is a circuit diagram showing a series resonant circuit.

The wireless PRU that has been described above with reference to FIG. 1 processes frequency inputs of the A4WP method and the Qi method by using the separate rectifiers 20-1 and 20-2, and thus may be used in both of the two methods. However, the wireless PRU of FIG. 1 requires additional costs and is difficult to implement as a small wireless PRU appropriate for a portable device because of the necessity of the two rectifiers 20-1 and 20-2. In order to solve these problems, a resonator will be analyzed with reference to FIGS. 2 and 3. FIG. 2 is a circuit diagram showing a series resonant circuit.

The resonator shown in FIG. 2 is formed by removing the capacitors Cp1 104-1 and Cp2 104-2 from the two resonators 10-1 and 10-2 of FIG. 1. The resonator is a series resonator because the inductor L 100 and the capacitor Cs 102 are connected in series. In this case, it is possible to achieve high reception efficiency by setting a resonance frequency made with the inductor L 100 and the capacitor Cs 102 to be approximately equal to or similar to a power transmission frequency of a power transmitting unit (PTU). Accordingly, a resonance frequency of the inductor L1 100-1 and the capacitor Cs1 102-1 in FIG. 1 is higher than that of the inductor L2 100-2 and the capacitor Cs2 102-2.

At the resonance frequency, the series resonator of FIG. 2 has maximum reception of an electric current because an impedance Ztank thereof theoretically becomes zero. On the other hand, when the frequency of power supplied by the PTU is lower or higher than the resonance frequency, the impedance Ztank increases, and thus an output electric current of the resonator rapidly decreases. That is, it can be seen that the impedance Ztank is extremely high when the frequency of power is not the resonance frequency.

Figure 3:
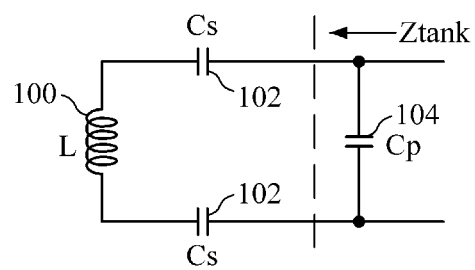
FIG. 3 is a circuit diagram showing a series resonant circuit and a parallel capacitor.

FIG. 3 is a circuit diagram showing a series resonant circuit and a parallel capacitor. Referring to FIG. 3, a capacitor Cp 104 is a capacitor connected in parallel to a resonator and is a kind of energy circulation passage formed to circulate energy of the resonator when the energy is not transferred to a rectifier. When the capacitor Cp 104 is not present and the rectifier of FIG. 1 does not operate, the series resonant circuit responds to parasitic capacitance generated by VACP 200-1 and VACN 202-1, thereby generating high-frequency noise. This affects operational stability of the PRU and increases electromagnetic interference (EMI) thereof. Accordingly, the capacitor Cp 104 is added to suppress such a phenomenon. Generally, the capacitor Cp 104 is set to be moderately smaller than the capacitor Cs 102. When the capacitor Cp 104 is set to be much smaller than the capacitor Cs 102, an effect of removing noise disappears. When the capacitor Cp 104 is set to be much larger than the capacitor Cs 102, a large electric current is returned to the resonator through the capacitor Cp 104. Therefore, an electric current supplied to the rectifier decreases, and thus power is not smoothly supplied to a load. Accordingly, as shown in FIG. 1, it is preferable for the capacitors Cs1 102-1 and Cp1 104-1 to be set to be similar to each other in units of pF and the capacitors Cs2 102-2 and Cp2 104-2 to be set to be similar to each other in units of nF.

The capacitor Cp1 104-1 of the A4WP resonator 10-1 of FIG. 1 has a very small value which is equal to parasitic capacitance seen from an input of the A4WP rectifier 20-1. Accordingly, there is no problem in operation even without the capacitor Cp1 104-1. That is, the capacitor Cp1 104-1 may be removed from the high-frequency resonator.

Figure 4:
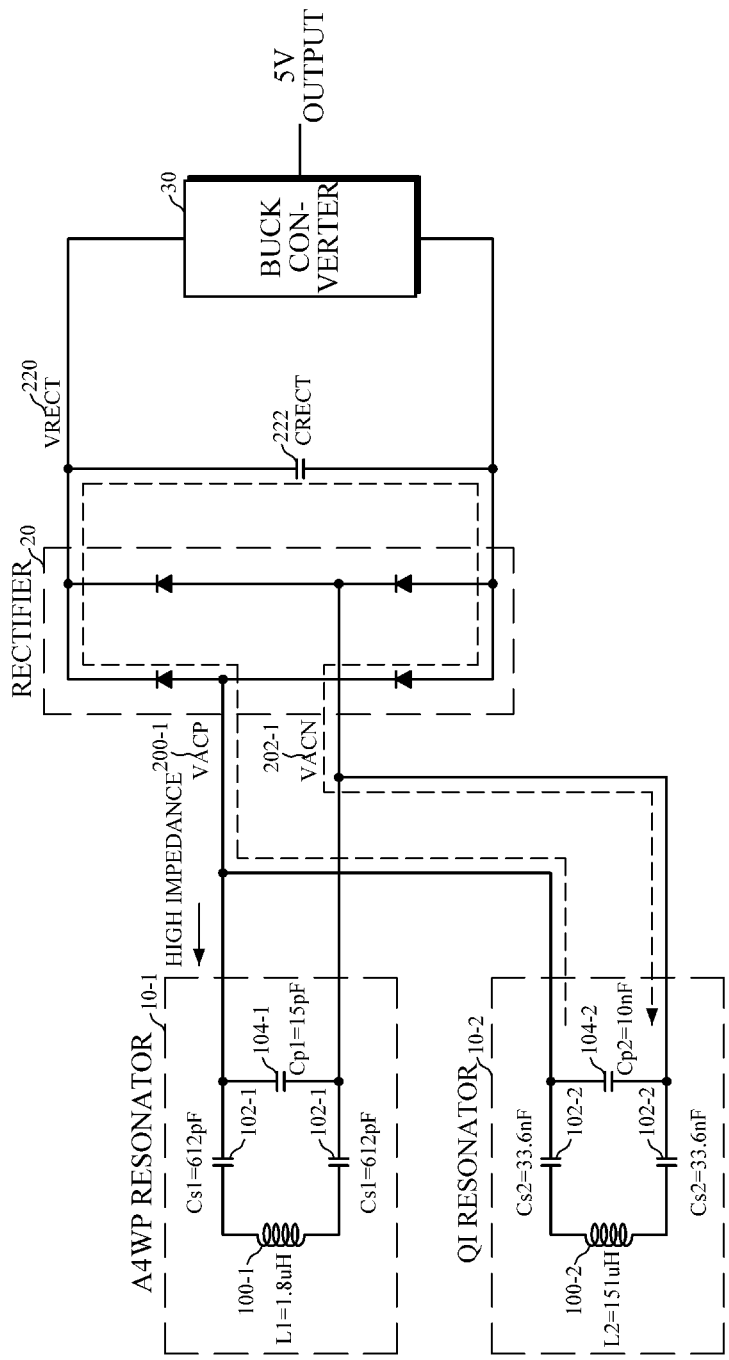
FIG. 4 is a circuit diagram showing a wireless PRU that receives energy at a Qi frequency.

FIG. 4 is a circuit diagram showing a wireless PRU that receives energy at a Qi frequency.

Referring to FIG. 4, when the wireless PRU operates at the Qi frequency, an impedance of L2 100-2 and Cs2 102-2 of the Qi resonator 10-2 is greatly decreased, and the A4WP resonator 10-1 composed of L1 100-1 and Cs1 102-1 has a very different resonance frequency from the Qi resonator 10-2. Accordingly, impedance of L1 100-1 and Cs1 102-1 of the A4WP resonator 10-1 are greatly increased, and thus the A4WP resonator 10-1 may be ignored from a standpoint of the Qi resonator 10-2.

Conversely, when energy at the A4WP frequency is transferred, the impedance of L1 100-1 and Cs1 102-1 of the A4WP resonator 10-1 is greatly decreased, and the resonance frequency of L2 100-2 and Cs2 102-2 of the Qi resonator 10-2 is very small. Accordingly, the impedance of the Qi resonator 10-2 is greatly increased, and thus a series resonant circuit for Qi may be ignored. Accordingly, as shown in FIG. 4, there is no problem in operation even when the two resonators 10-1 and 10-2 are connected in parallel and only one rectifier 20 is used. It should be noted that the resonators 10-1 and 102 may exclusively operate depending on received frequencies.

However, when Cp1 104-1 and Cp2 104-2 are connected to remove noise, a problem may occur. FIG. 4 shows an example in which a wireless PRU receives energy at the Qi frequency. As described above, the impedance of L1 100-1 and Cs1 102-1 of the A4WP resonator 10-1 is greatly increased, and Cp1 104-1 is very small. Accordingly, the impedance of Cp1 104-1 is very large, and thus most of the electric current of the Qi resonator 10-2 is supplied to the rectifier 20 and used to supply power to a load. Therefore, there is no problem in this case.

Figure 5:
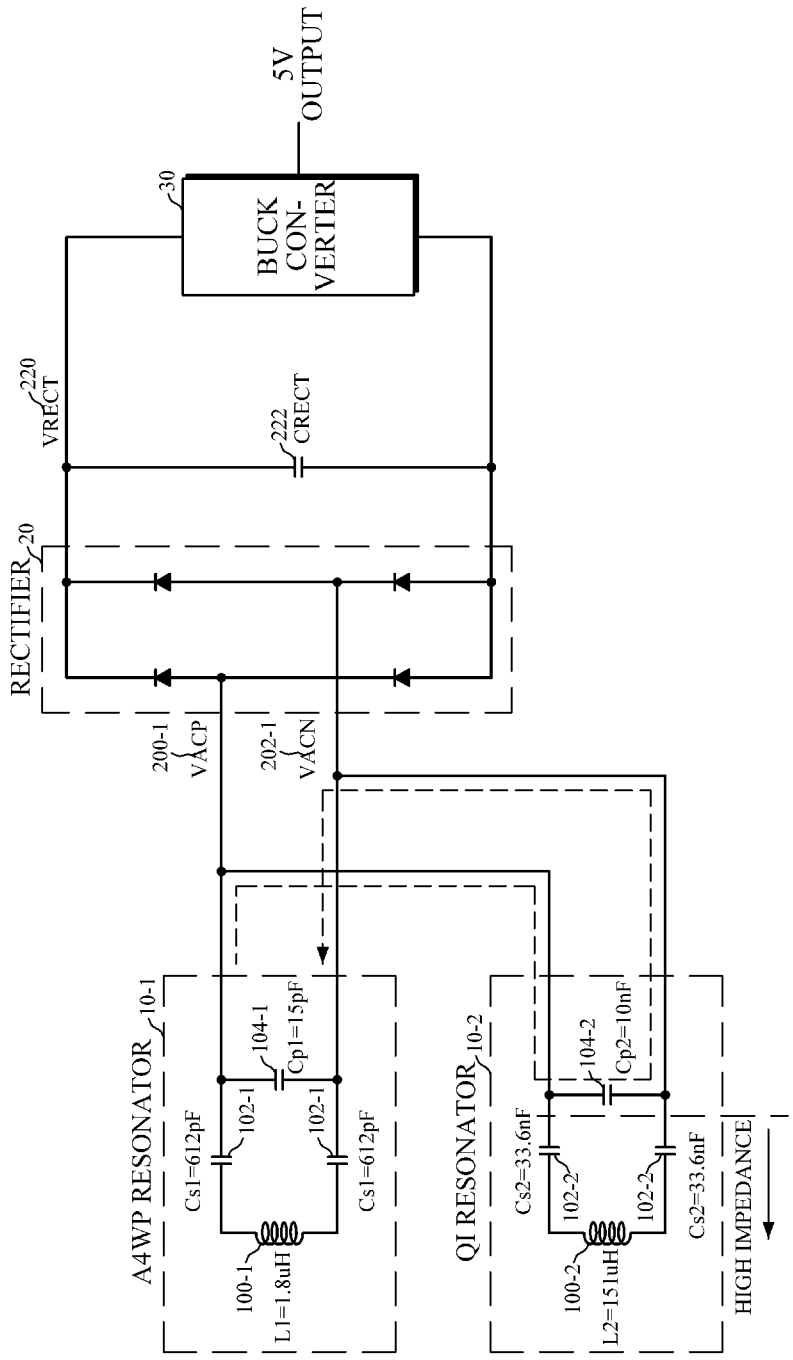
FIG. 5 is a circuit diagram showing a wireless PRU that receives energy at an A4WP frequency.

FIG. 5 is a circuit diagram showing a wireless PRU that receives energy at an A4WP frequency.

In FIG. 5, unlike FIG. 4, a problem occurs. When energy at the A4WP frequency is received, the A4WP resonator 10-1 responds and generates an electric current. However, since the impedance of Cp2 104-2 of the Qi resonator 10-2 is low, most of the electric current circulates through Cp2 104-3, and thus the amount of electric current transferred to the rectifier 20 is decreased. This causes problems in supplying power to the load. It should be appreciated that the impedance of L2 100-2 and Cs2 102-2 of the Qi resonator 10-2 is greatly increased even in this case.

Figure 6:
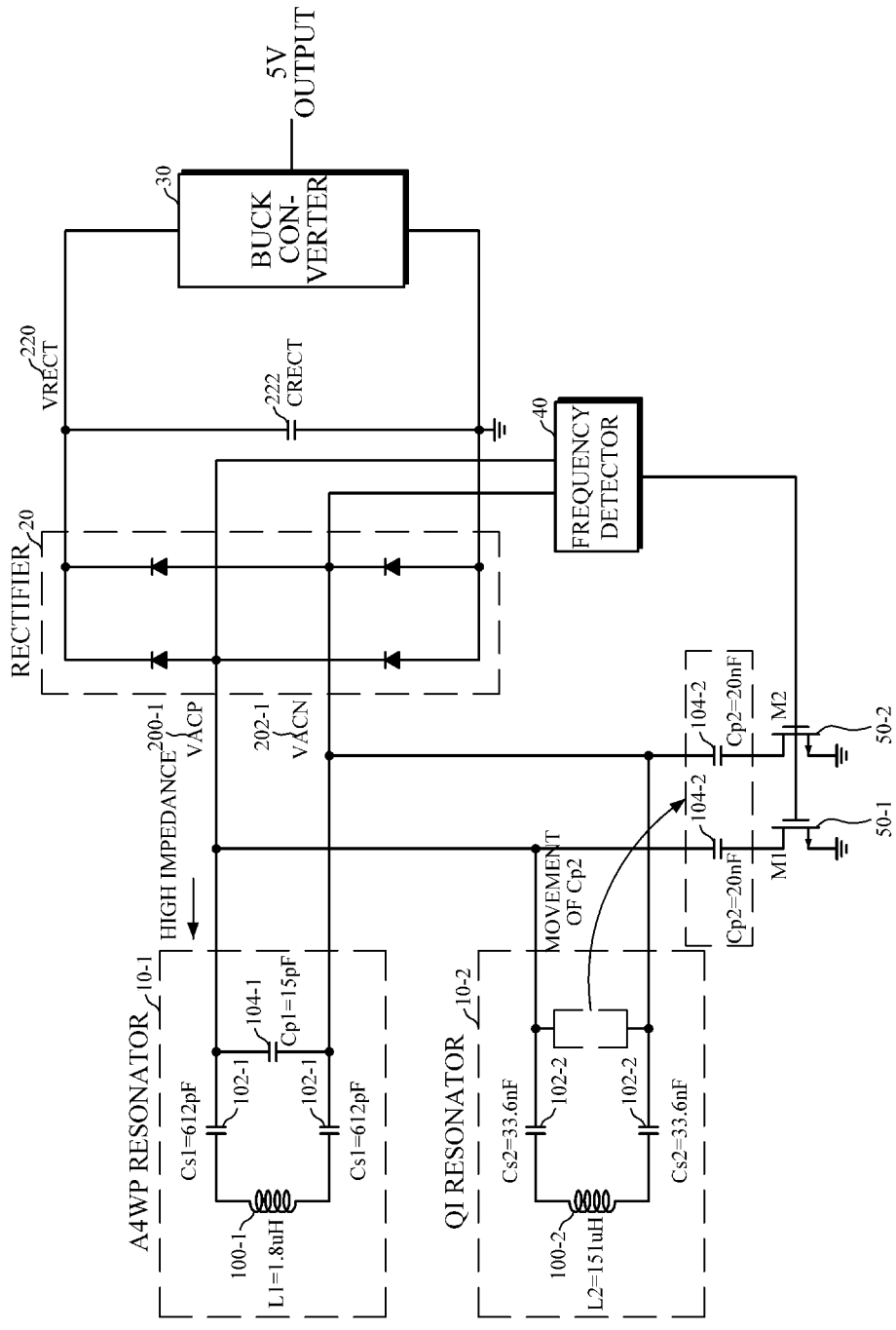
FIG. 6 is a circuit diagram showing a dual-band wireless PRU having a single rectifier according to an embodiment of the present invention.

FIG. 6 is a circuit diagram showing a dual-band wireless PRU having a single rectifier according to an embodiment of the present invention.

In order to solve the problems that have been described with reference to FIG. 5, a circuit shown in FIG. 6 is proposed. Referring to FIG. 6, the dual-band wireless PRU includes the A4WP resonator 10-1, the Qi resonator 10-2, the single rectifier 20, the buck converter 30, a frequency detector 40, two capacitors Cp2 104-2 separated from the Qi resonator 10-2, and two switches M1 50-1 and M2 50-2.

The A4WP resonator 10-1 and the Qi resonator 10-2 are connected in parallel. One rectifier 20 is provided to receive, as an input, a node at which the outputs of the A4WP resonator 10-1 and the Qi resonator 10-2 are connected in parallel. The switch M1 50-1 has a first output and an input, and the switch M2 50-2 has a second output and an input. The first output is connected to the capacitors Cp2 104-2, and the second output is connected to a ground. Each of the capacitors Cp2 104-2 is connected in parallel to the Qi resonator 10-2 and has one terminal connected in series to the switch M1 50-1 or M2 50-2 and the other terminal connected to the rectifier inputs VACP 200-1 or VACN 202-1. The frequency detector 40 detects an input frequency from the rectifier inputs VACP and VACN and has an output connected to an input of the switches M1 50-1 and M2 50-2. The A4WP resonator 10-1 may have the inductor L1 100-1 connected in series to the capacitor Cs1 102-1 and connected in parallel to the capacitor Cp1 104-1. The Qi resonator 10-2 has the inductor L2 100-2 connected in series to the capacitor Cs2 102-2.

An operating process of a wireless PRU with the above-described configuration will be described below in detail. The frequency detector 40 detects an input frequency from variations of the input voltages VACP 200-1 and VACN 202-1 of the rectifier 20. The capacitors Cp2 104-2 are connected in series to the switches M1 50-1 and M2 50-2 and connected to the rectifier input voltages VACP and VACN. When the frequency detected by the frequency detector 40 is a low frequency of a Qi region, an output of the frequency detector 40 is high and the switches M1 50-1 and M2 50-2 are switched on. Accordingly, the capacitors Cp2 104-2 are connected to the rectifier input voltages VACP 200-1 and VACN 202-1. That is, the capacitors Cp2 104-2 that were connected in parallel to each other are connected to the ground. In this case, the capacitors Cp2 104-2 connected to the ground have the same electric characteristics as the capacitors Cp2 104-2 connected in parallel to each other by enlarging capacitance of the capacitors Cp2 104-2, for example, by a factor of two.

On the other hand, when the frequency detected by the frequency detector 40 is a high frequency, the switches M1 50-1 and M2 50-2 are switched off, and the capacitors 104-2 are not seen. Accordingly, the capacitors Cp2 104-2 are disconnected from the rectifier input voltages VACP 200-1 and VACN 202-1.

By configuring the circuit as described above, when the A4WP resonator 10-1 operates, the capacitors Cp2 104-2 are not shown and the impedance of L2 100-2 and Cs2 102-2 of the Qi resonator 10-2 is greatly increased. Accordingly, most output electric current of the A4WP resonator 10-1 is supplied to the rectifier 20, and thus there is no problem in supplying power to a load. Accordingly, it is possible to transmit dual-band wireless power by positioning the two resonators 10-1 and 10-2 having different frequencies in parallel by using only a single rectifier 20 through the proposed method.

In FIG. 6, the rectifier 20 is composed of diodes, but an active rectifier using active elements may be used. The rectifier 20 may be a full-wave rectifier, as shown in FIG. 6. Alternatively, the rectifier 20 may be a half-wave rectifier. An example in which a half-wave rectifier is used will be described with reference to FIG. 15. The buck converter 30 at a rear end of the rectifier 20 is an example of a power converter and may include various kinds of power converter. For example, the buck converter 30 may include a boost converter, a buck-boost converter, a low drop-out (LDO) regulator, etc. Accordingly, the present invention is not limited to the form of the rectifier 20 and to the power converter at the rear end.

In order to verify the proposed method with reference to FIG. 6, verification was performed by using an actual circuit with reference to FIGS. 7 to 14. In an experimental circuit, a resonator composed of L1 (1.7 uH) and Cs1 (600 pF) was an A4WP resonator, and a resonator composed of L2 (12 uH) and Cs2 (470 nF) was a Qi resonator. A frequency of 6.78 MHz was used when power was supplied to the A4WP resonator, and a frequency of 100 kHz was used when power was supplied to the Qi resonator. Accordingly, the resonant frequencies of the resonators were positioned at about 6.78 MHz and about 100 kHz.

Figure 7:
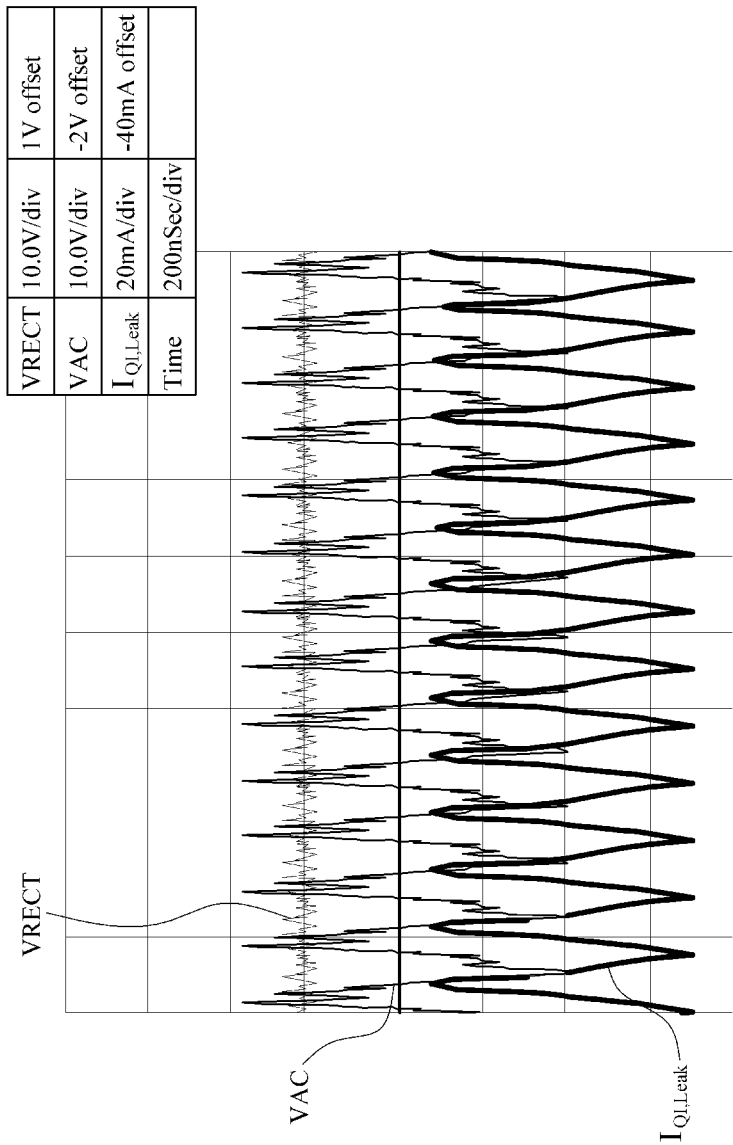
FIGS. 7 and 8 are a diagram showing an experimental result indicating that power at an A4WP frequency is received (when there are no parallel capacitors in a Qi resonator) and a circuit diagram showing a wireless PRU, respectively.
Figure 8:
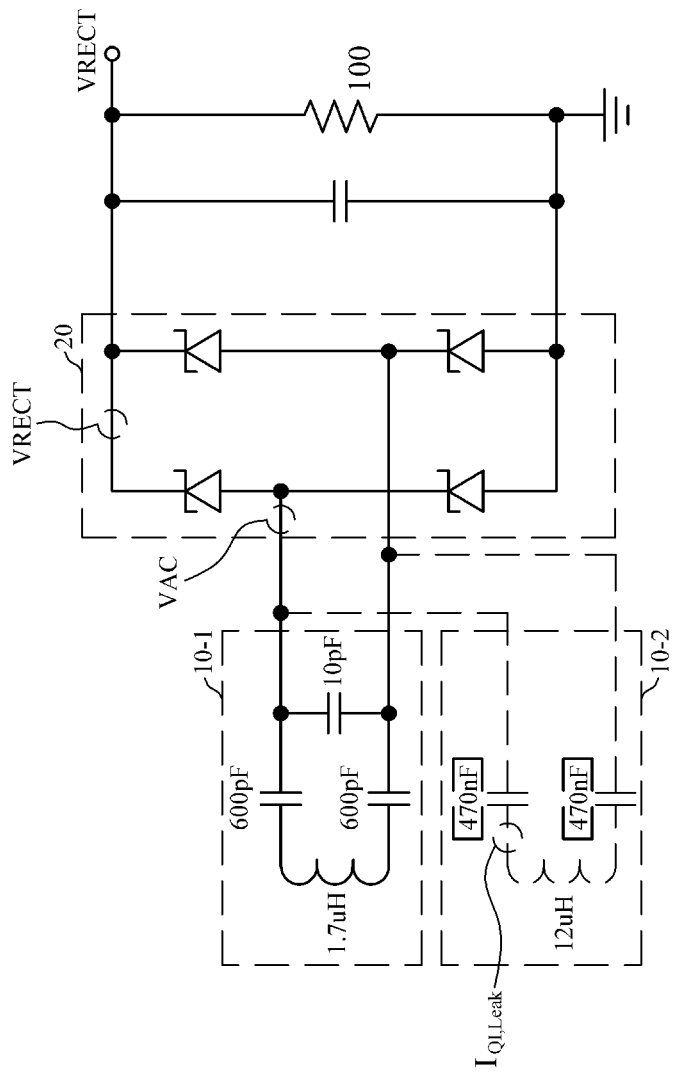

FIGS. 7 and 8 are a diagram showing an experimental result indicating that power at the A4WP frequency is received (when there are no parallel capacitors in a Qi resonator) and a circuit diagram showing a wireless PRU, respectively.

The frequency was 6.78 MHz, and power of 1 W was supplied to a load. In the experiment, a parallel capacitor was removed from the Qi resonator 10-2. In this case, an electric current flowing through the Qi resonator 10-2 was a very small value, for example, a peak of about 30 mA. That is, it can be seen that since a very high frequency signal entered in comparison to the resonance frequency of the Qi resonator 10-2, an impedance of a series resonator increased, and thus an electric current did not flow much and most of the electric current was supplied to the rectifier 20. Since the rectifier output voltage VRECT was about 10V and the load was 100Ω, power of 1 W was supplied.

Figure 9:
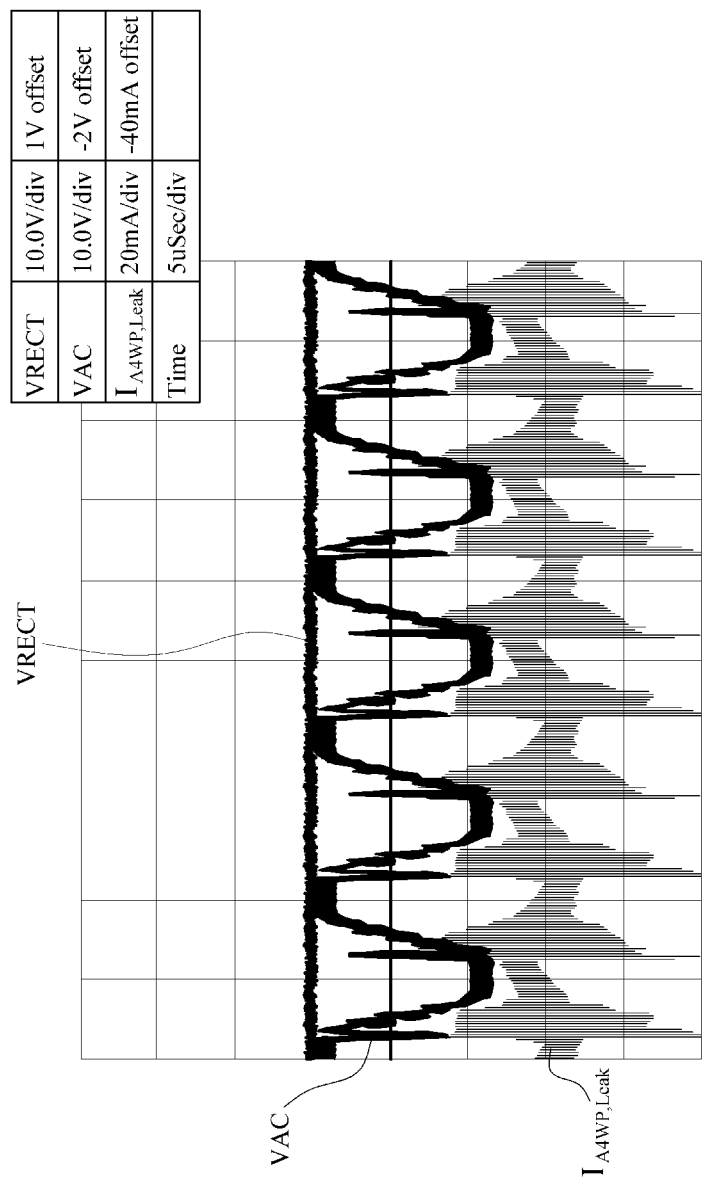
FIGS. 9 and 10 are a diagram showing an experimental result indicating that power at a Qi frequency is received (when there are no parallel capacitors in a Qi resonator) and a circuit diagram showing a wireless PRU, respectively.
Figure 10:
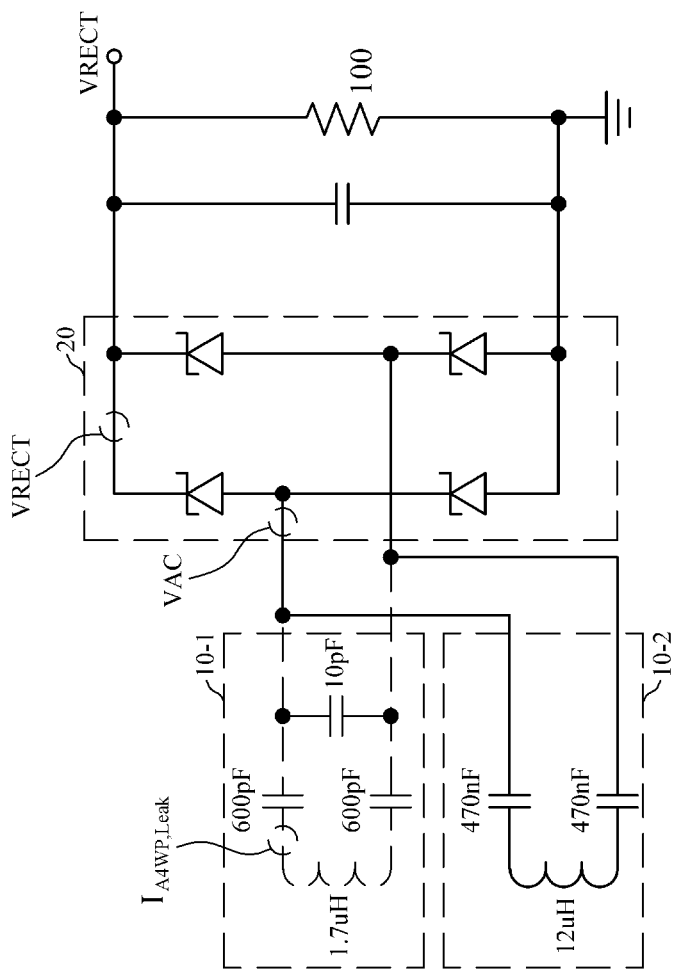

FIGS. 9 and 10 are a diagram showing an experimental result indicating that power at the Qi frequency is received (when there are no parallel capacitors in a Qi resonator) and a circuit diagram showing a wireless PRU, respectively.

A waveform obtained when wireless the power at the Qi frequency was received, as shown in the circuit of FIG. 10, is shown in FIG. 9. Since the Qi resonator 10-2 had no parallel capacitors, it can be seen that the rectifier input voltage VAC had high-frequency noise generated due to a resonance phenomenon caused by a parasitic capacitor.

Figure 11:
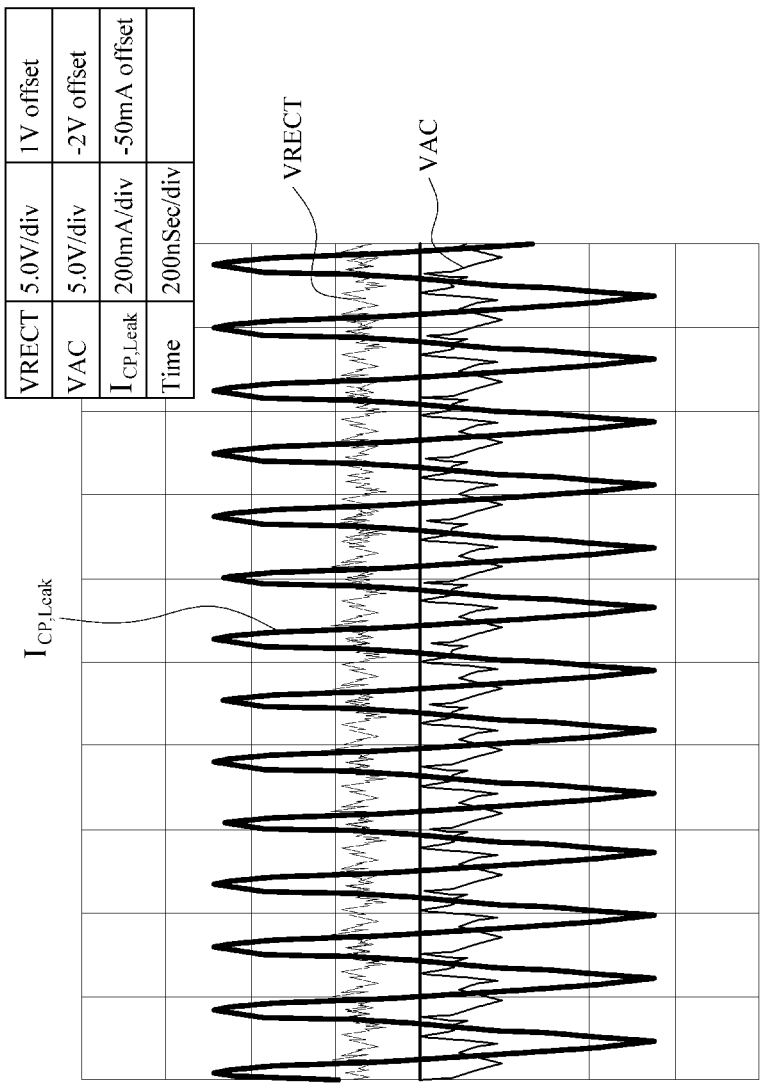
FIGS. 11 and 12 are a diagram showing an experimental result indicating that a parallel capacitor is attached to a Qi resonator and a circuit diagram showing a wireless PRU, respectively.
Figure 12:
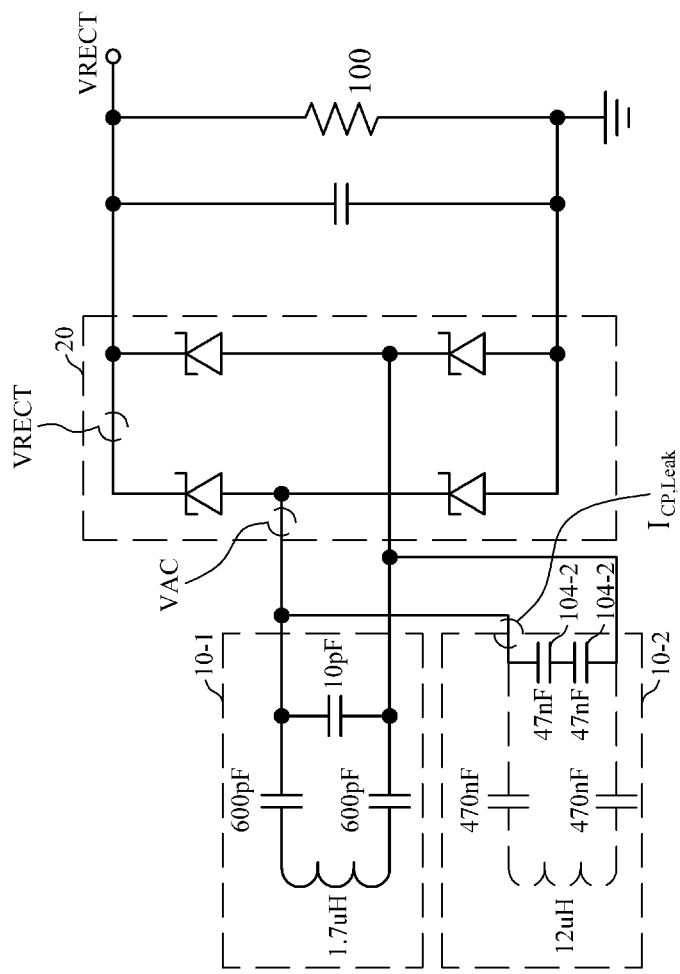

FIGS. 11 and 12 are a diagram showing an experimental result indicating that a parallel capacitor is attached to a Qi resonator and a circuit diagram showing a wireless PRU, respectively.

In order to remove noise when wireless power was received at the Qi frequency, as shown in FIG. 12, two capacitors Cp2 104-2 of 47 nF were connected in parallel to the Qi resonator 10-2. When such a circuit transmitted energy by using the A4WP method, an electric current flowing into the Qi resonator 10-2 greatly increased to a peak of 500 mA. That is, most of the output electric current of the A4WP resonator 10-1 circulated through the Qi resonator 10-2 and the power supplied to the rectifier 20 decreased, and thus the rectifier output voltage decreased to 4V and the power supplied to the load decreased by 60%.

Figure 13:
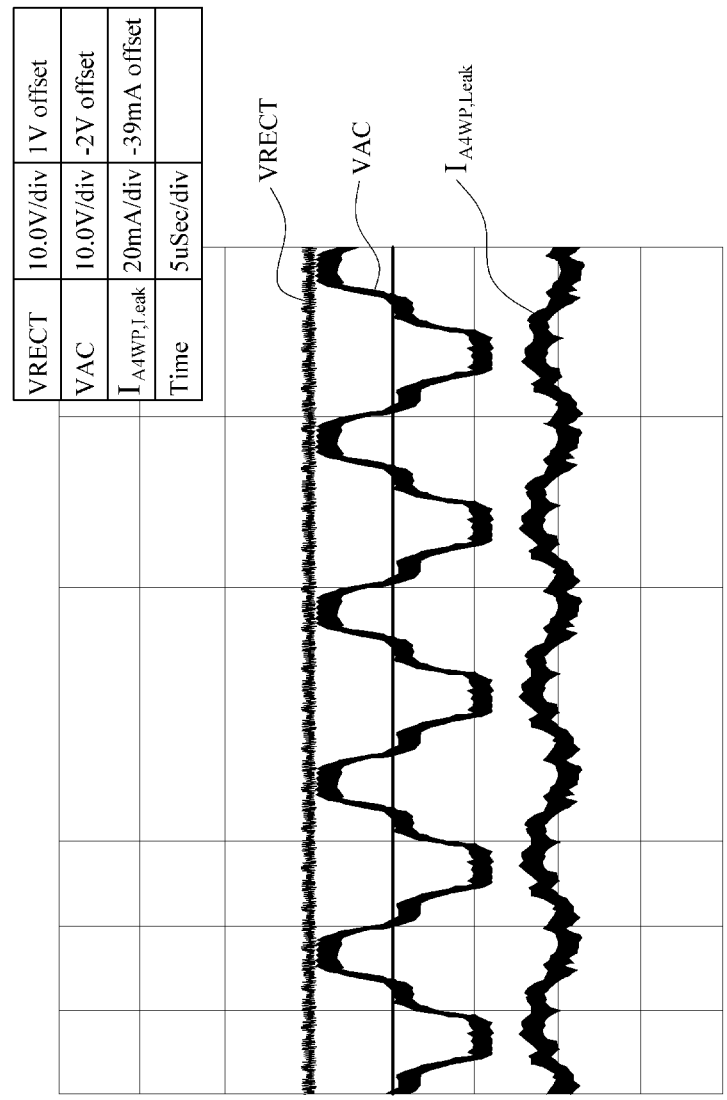
FIGS. 13 and 14 are a diagram showing an experimental result indicating that parallel capacitors of a Qi resonator are connected to a ground when the Qi resonator operates according to a method proposed by the present invention and a circuit diagram showing a wireless PRU, respectively.
Figure 14:
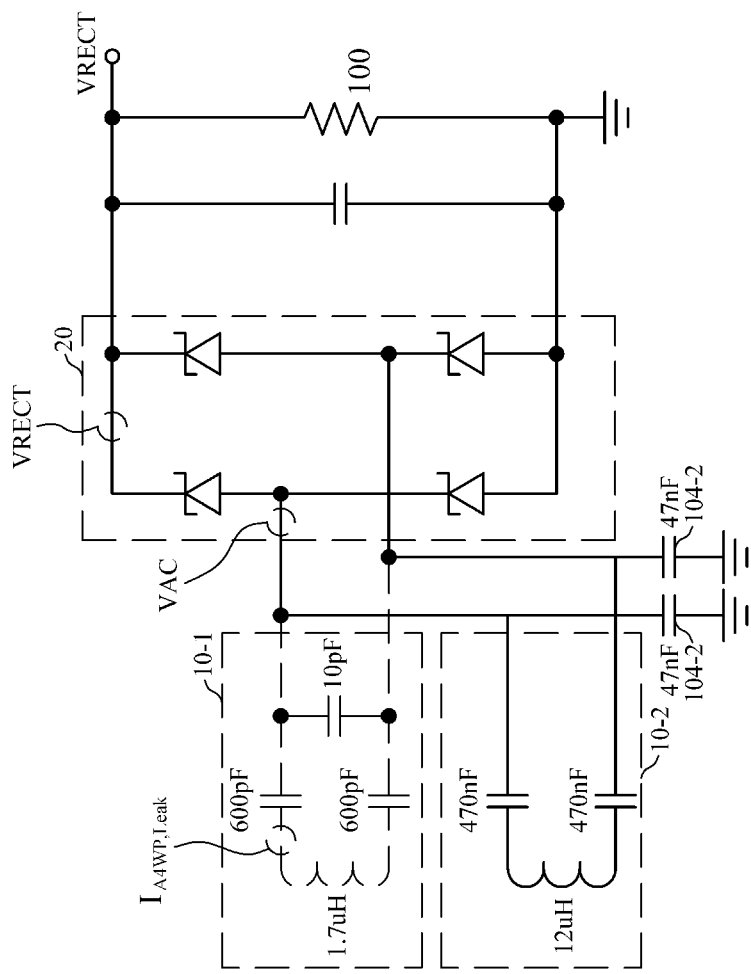

FIGS. 13 and 14 are a diagram showing an experimental result indicating that parallel capacitors of a Qi resonator are connected to a ground when the Qi resonator operates according to a method proposed by the present invention and a circuit diagram showing a wireless PRU, respectively.

In this case, in comparison to FIG. 7, the rectifier input voltage VAC was very stable and had no high-frequency noise. An electric current flowing into the A4WP resonator 10-1 was very small, for example, a peak of 4 mA, and thus most of the electric current was supplied to a load. Even in the experimental result, the rectifier voltage VRECT became 10V, and 1 W was normally supplied to the load.

It can be seen that, according to the proposed method, it is possible to transmit dual-band frequency wireless power by using two resonators with different frequencies and a common rectifier. According to the proposed method, it seems that a burden is increased by additionally including the switches M1 and M2. However, it is easier to form the switches M1 and M2 than to form a device constituting a rectifier when an integrated circuit is implemented. Accordingly, the proposed structure may have many advantages in terms of price or difficulty of circuit configuration.

Figure 15:
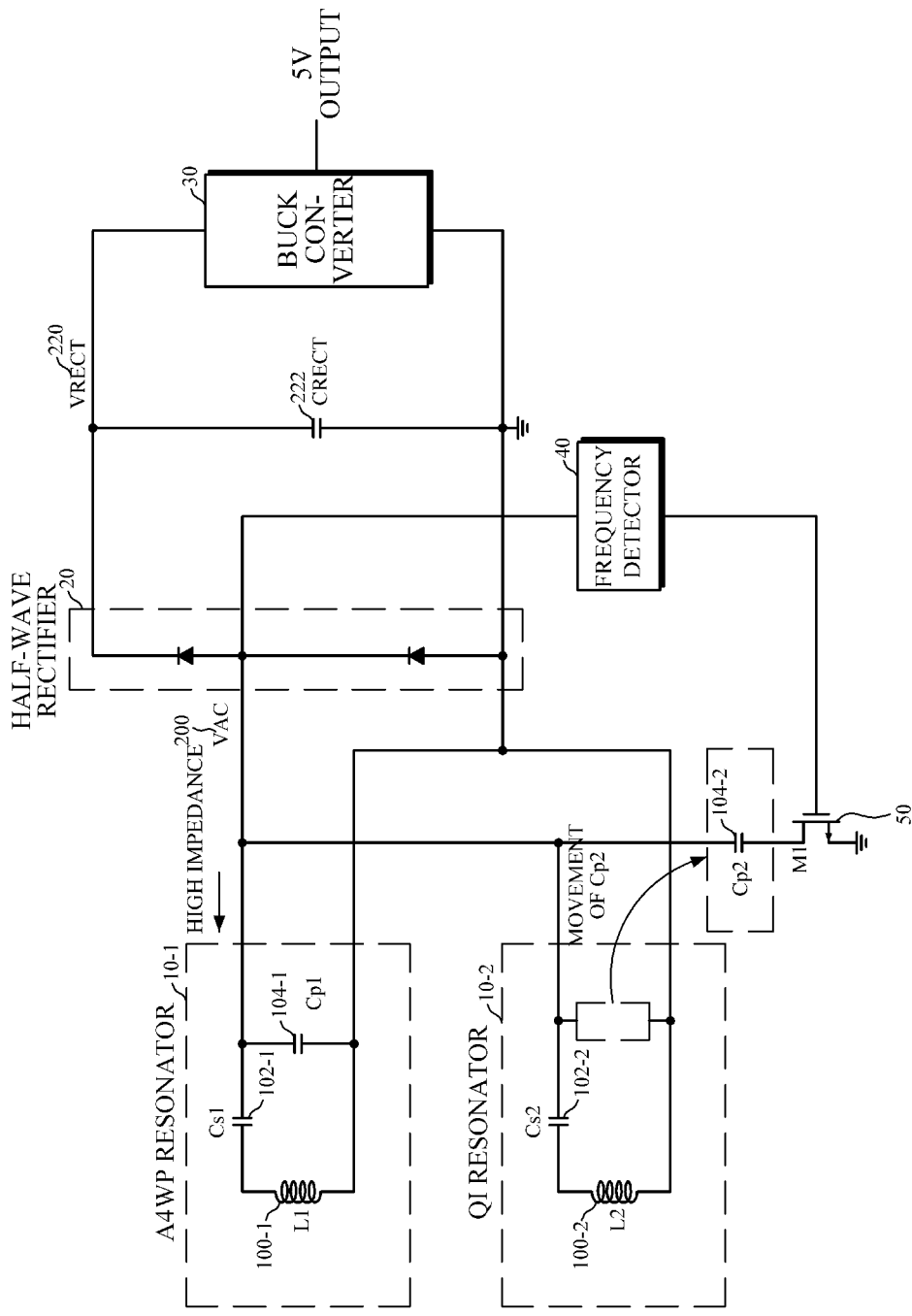
FIG. 15 is a circuit diagram showing a dual-band wireless PRU using a half-wave rectifier according to an embodiment of the present invention.

FIG. 15 is a circuit diagram showing a dual-band wireless PRU using a half-wave rectifier according to an embodiment of the present invention.

FIG. 6 has been described by using a full-wave rectifier, but a half-wave rectifier may be used, as shown in FIG. 15.

A circuit structure of FIG. 15 has the same principle as that of FIG. 16 except for the number of capacitors Cp1 104-1 and Cp2 104-2 connected in parallel to the resonators 10-1 and 10-2 of FIG. 6, the number of switches M1 50, and the number of diodes of the rectifier 20, and a detailed description thereof will be omitted.

So far, the present invention has been described with reference to embodiments thereof. It should be understood by those skilled in the art that various changes in form and details may be made therein without departing from the spirit and scope of the present invention. Therefore, the disclosed embodiments should be considered in a descriptive sense only and not for purposes of limitation. Also, the scope of the presents invention is defined not by the detailed description of embodiments but by the appended claims, and all differences within the scope thereof should be construed as being included in the present invention.

The invention claimed is:

1. A wireless power receiving unit (PRU) comprising:
   a first resonator;
   a second resonator connected in parallel to the first resonator;
   a single rectifier having, as an input, a node in which outputs of the first resonator and the second resonator are connected in parallel to each other;
   at least one switch having a first output, a second output connected to a ground, and an input;
   at least one capacitor connected in parallel to the second resonator and having one terminal connected to the first output of the switch and another terminal connected to the input of the rectifier; and
   a frequency detector configured to detect an input frequency from the input of the rectifier and having an output connected to the input of the switch.

2. The wireless PRU of claim 1, wherein the first resonator is a high-frequency resonator, and the second resonator is a low-frequency resonator.

3. The wireless PRU of claim 1, wherein the first resonator is a series resonator having at least one inductor and at least one capacitor connected in series.

4. The wireless PRU of claim 1, wherein the second resonator is a series resonator having at least one inductor and at least one capacitor connected in series.

5. The wireless PRU of claim 1, wherein:
   the switch is turned on when the frequency detected by the frequency detector is a low frequency; and the switch is turned off to separate the capacitor from the input of the rectifier when the frequency detected by the frequency detector is a high frequency.

* * * * *